US011326656B2

(12) United States Patent
Resvoll et al.

(10) Patent No.: US 11,326,656 B2
(45) Date of Patent: May 10, 2022

(54) CONTROLLING AN ACTUATOR OF AN ACTUATOR UNIT OF A MOTOR VEHICLE

(71) Applicant: GKN Automotive Ltd., Birmingham (GB)

(72) Inventors: Erik Resvoll, Bruchhausen (DE); Markus Weller, Kettenhausen (DE); Mark Zimmermann, Bornheim (DE); Andreas Langhanki, Duisburg (DE)

(73) Assignee: GKN Automotive Ltd., Birmingham (GB)

( * ) Notice: Subject to any disclaimer, the term of this patent is extended or adjusted under 35 U.S.C. 154(b) by 24 days.

(21) Appl. No.: 17/043,744

(22) PCT Filed: May 8, 2018

(86) PCT No.: PCT/EP2018/061840
§ 371 (c)(1),
(2) Date: Sep. 30, 2020

(87) PCT Pub. No.: WO2019/214808
PCT Pub. Date: Nov. 14, 2019

(65) Prior Publication Data
US 2021/0033156 A1 Feb. 4, 2021

(51) Int. Cl.
*F16D 48/06* (2006.01)

(52) U.S. Cl.
CPC ...... *F16D 48/06* (2013.01); *F16D 2500/1023* (2013.01); *F16D 2500/3121* (2013.01)

(58) Field of Classification Search
CPC ............ F16D 48/06; F16D 2500/1023; F16D 2500/3121; F16D 2500/106;
(Continued)

(56) References Cited

U.S. PATENT DOCUMENTS 5,080,640 A 1/1992 Botterill
9,067,601 B2 * 6/2015 Itabashi ................ F02D 11/105
(Continued)

FOREIGN PATENT DOCUMENTS

CN 103223939 A 7/2013
CN 103573863 A 2/2014
(Continued)

OTHER PUBLICATIONS

International Search Report and Written Opinion for PCT/EP2018/061840 dated Jan. 25, 2019 (11 pages; with English translation).
(Continued)

*Primary Examiner* — Edwin A Young
(74) *Attorney, Agent, or Firm* — Bejin Bieneman PLC

(57) ABSTRACT

A method for controlling an actuator of an actuator unit of a motor vehicle includes detecting desired activation of the actuator, detecting whether a currently present operating state of the motor vehicle is a first operating state or a second operating state, selecting either a first control routine upon detecting the first operating state or a second control routine upon detecting the second operating state, and actuating the drive motor with the selected first control routine or second control routine. A drive motor of the actuator unit is controlled depending on the operating state of the motor vehicle. In the first operating state, an actuation of the actuator occurs according to the first control routine with high dynamics of the drive motor, and in the second operating state, the actuation of the actuator occurs according to the second control routine with adjusted dynamics of the drive motor.

20 Claims, 2 Drawing Sheets

(58) Field of Classification Search
CPC ......... F16D 2500/302; F16D 2500/501; F16D 2500/50293; F16D 2500/70605; B60W 10/02; B60W 10/06
See application file for complete search history.

(56) References Cited

U.S. PATENT DOCUMENTS

| | | | | |
|---|---|---|---|---|
| 9,643,599 | B2* | 5/2017 | Kikuchi | ............ B60G 17/0185 |
| 2005/0194228 | A1 | 9/2005 | Baehr | |
| 2011/0022286 | A1* | 1/2011 | Sato | ................ B60K 26/02 |
| | | | | 701/99 |
| 2016/0280064 | A1 | 9/2016 | Nozu et al. | |

FOREIGN PATENT DOCUMENTS

| | | | |
|---|---|---|---|
| CN | 105723113 A | | 6/2016 |
| DE | 10065355 A1 | | 7/2002 |
| DE | 10065355 C2 | | 11/2002 |
| DE | 10308692 A1 | | 9/2003 |
| DE | 10347114 A1 | | 4/2004 |
| DE | 102012015291 A1 | | 2/2014 |
| DE | 102014223559 A1 | | 5/2015 |
| EP | 2788216 A1 | | 10/2014 |
| JP | 2014117064 A | | 6/2014 |
| JP | 2014241720 A | | 12/2014 |
| JP | 2017180489 A | * | 10/2017 |

OTHER PUBLICATIONS

CIPO Office Action dated Aug. 25, 2021 for Application No. CN201880093263.8 (12 pages; with English translation).

A. Fan Shidian Law; "Hybrid Modelling and Simulation of the Torsional Vibration of a Vehicle Driveline Systems"; Transmission Technology; Jun. 25, 2003 (9 pages; with English translation of abstract).

* cited by examiner

CONTROLLING AN ACTUATOR OF AN ACTUATOR UNIT OF A MOTOR VEHICLE

CROSS-REFERENCE TO RELATED APPLICATIONS

This application is a national stage of, and claims priority to, Patent Cooperation Treaty Application No. PCT/EP2018/061840, filed on May 8, 2018, which application is hereby incorporated herein by reference in its entirety.

BACKGROUND

The design of a clutch and of an actuator is known e.g. from DE 100 65 355 C2. In said document, the emphasis is on implementing a rapid return with a damped impact behavior for the actuator. To do this, the electric motor is operated in an adapted fashion so that just before an output position for generating the braking torque is reached the electric motor is either short-circuited or a positive voltage is applied to the electric motor. This is intended to damp impacting of the balls against the groove ends of the actuating rings and therefore prevent a severe impact which is generated in this way.

SUMMARY

A method is described herein for controlling an actuator of an actuator unit of a motor vehicle. In particular, the actuator is provided for activating a clutch, in particular a multi-disk clutch, such as a clutch which is arranged on a side shaft of a motor vehicle, so that by closing the clutch the entire axle (the actuated clutch is referred to here as a booster) or else just one wheel (the actuated clutch is referred to here as a twinster) of the motor vehicle is connected to a drive unit of the motor vehicle in a torque-transmitting fashion. The actuator is, in particular, an electromechanical actuator.

An actuator comprises an (electric) drive motor and a control device. An actuator can have, e.g., a ramp mechanism with a rotatable first disk (adjusting ring) which has first ramps (grooves), a second disk (adjusting ring) which can only be moved in an axial direction and which has second ramps (grooves), and balls which are arranged between the disks, in the first ramps and second ramps, as well as at least one spring for moving the second disk in the axial direction. The second disk can be moved along the axial direction through the rotation of the adjusting ring by the drive motor. For example, a clutch can be activated by this movement in the axial direction. The drive motor can be connected to the first disk by means of one or more gear wheel pairings, in order to transmit a rotational movement.

The method described herein can improve the comfort of a motor vehicle. In particular, the noise and perceptible operational forces from the drive train, which can be heard by the motor vehicle occupant while the motor vehicle is operating, can be reduced or avoided by the method herein.

The features which are specified individually in the claims can be combined with one another in a technologically appropriate fashion and explanatory contents from the description from the figures can be added thereto, wherein further examples are shown.

A method for performing open-loop control (also referred to as control) of an actuator of an actuator unit of a motor vehicle is proposed. The actuator unit has at least one component (e.g. a clutch) which is activated by the actuator, the actuator and an (electric) drive motor for driving the actuator. The drive motor is actuated as a function of an operating state of the motor vehicle. In the first operating state, the actuator is activated according to a first control routine with high dynamics of the drive motor. In a second operating state, the actuator is activated according to a second control routine with dynamics, which are lower and/or adapted (to a real system behavior) of the drive motor. The method comprises at least the following steps:
a) detecting desired activation of the actuator;
b) detecting a currently present operating state of the motor vehicle;
c) selecting the control routine which is provided for the operating state; and
d) actuating the drive motor with the selected first control routine or second control routine.

The first operating state and the second operating state relate at least to generation of noise by the motor vehicle.

In particular, the drive motor has one or more gearwheel pairings (mechanical components of the actuator unit which are connected to one another, e.g. with play), by means of which a torque of the drive motor for activating the component can be transmitted. In particular, e.g. a rotational movement of the drive motor is converted into movement in an axial direction. In particular the component is activated by means of the movement.

In particular, the actuator unit causes noise, e.g. as a result of the application of the tooth flanks of gearwheels which are in engagement with one another (in particular when the (rotational) movement of the drive motor reverses). When the actuator is activated with high dynamics (first control routine), the drive motor is actuated with a high speed and the shortest possible deceleration in comparison with the desired activation. In this context, e.g. the mechanical components of the actuator unit which are connected to one another with play are accelerated and moved as quickly as possible so that once the play which is present between the components is overcome mechanical contact between the components occurs. This mechanical contact can be perceived acoustically (can be audible) by occupants of the motor vehicle particularly in specific operating states of the motor vehicle.

When the actuator is activated with low dynamics (second control routine), the drive motor is actuated at a relatively low speed and, if appropriate, with a deceleration in comparison with the desired activation. In this context, e.g. the mechanical components of the actuator unit which are connected to one another with play are accelerated more slowly and/or are moved at a lower speed (than in the case of the first control routine), so that once the play which is present between the components is overcome mechanical contact occurs (in a damped fashion).

When necessary, that is to say in particular depending on a current noise situation, high dynamics which are potentially technically possible (and possibly customary for this control operation) are rejected and instead lower dynamics are selected.

In particular, an improvement of the control quality and therefore also of the acoustic behavior can be achieved by approximating the dynamics of the setpoint value specification more closely to the dynamics of the real system (second control routine). To do this, the dynamics of the real system are determined during operation and the dynamics of the setpoint value specification are learnt by a control device. The setpoint specification can be implemented, in particular, in such a way that this setpoint value specification can be implemented as precisely as possible with the possible dynamics of the real system.

It is proposed here that in accordance with the currently present operating state of the motor vehicle it is detected (e.g., by means of a control device) which control routine is to be selected to actuate the drive motor.

The second control routine comprises in particular activation of the actuator with relatively low dynamics and/or with improved approximation of the setpoint value specification to the actual system behavior over the entire control range than by the first control routine. In particular, by means of situation-dependent filtering of the setpoint value specification in accordance with the system time constant it is possible to achieve a reduction in the control error and in the manipulated variables, as a result of which, for example, the transient response can be improved and overshoots in the clutch torque can be avoided. By reducing the manipulated variables, for example, a reduction in power and therefore lower consumption of energy is possible.

In particular, the actuator or the drive motor thereof is actuated more slowly during the second control routine.

In particular, an abrupt acceleration of the drive motor is reduced and a sudden change in speed of the components driven by means of the drive motor is at least temporarily reduced. Furthermore, a reduction in noise can be achieved by virtue of more gentle behavior of the drive motor and of the actuator system both during operation and when approaching the end stop.

In particular this makes it possible for play which is present between the mechanical components of the actuator unit to be overcome with reduced acceleration or a reduced speed. For example, it can therefore be made possible for the tooth flanks of gearwheels which are in engagement with one another to bear against one another more slowly/gently than in the first control routine. The generation of noise can therefore be reduced.

In particular, the motor vehicle has a first noise generation level in the first operating state, and a second noise generation level in the second operating state. The second noise generation level is lower than the first noise generation level. In particular, the instances of the generation of noise differ (or the noise levels, preferably in the passenger compartment of the motor vehicle, preferably in the vehicle occupant region of the motor vehicle) by at least three decibels, in particular by at least six decibels, preferably by at least nine decibels.

In particular, the generation of noise is determined at a fixed location in the passenger compartment of the motor vehicle, in particular in the vehicle occupant region of the motor vehicle (that is to say the region in which the seats for users of the motor vehicle are arranged).

In particular, the second control routine is therefore carried out when the generation of noise by the motor vehicle is lower. In this state of the motor vehicle, activation of the actuator could (more likely) be perceived acoustically. It is therefore proposed to select the control routine in accordance with background noise which can be perceived by the occupant of the motor vehicle. The comfort of the motor vehicle can then be perceptibly increased.

The effectiveness of the second control routine can be checked or verified, in particular, in a test setup. In particular, the method is checked in a stationary motor vehicle or on a separately provided actuator unit. In this context, on the one hand according to a first control routine the actuator is activated with high dynamics of the drive motor. And on the other hand, according to a second control routine the actuator is activated with adapted dynamics of the drive motor. The noise levels which occur when the actuator is activated are determined/measured and compared with one another. In this context, the activation of the second control routine should generate noise levels whose maximum volume is at least 1 decibel, in particular at least 2 decibels, preferably at least 3 decibels and particularly preferably at least 6 decibels quieter than the maximum volume of the noise which occurs when activation of the first control routine is carried out.

In particular, a multiplicity of different control routines can be provided depending on the generation of noise by the motor vehicle. The control routines can be executed in a graduated fashion with respect to the dynamics of the actuation of the actuator: a first control routine comprises the highest dynamics of the actuation (greatest generation of noise during the activation of the actuator), a second control routine comprises lower dynamics (with less generation of noise), and an nth control routine (where n=3, 4, 5 . . . ) comprises even lower dynamics than the n−1th control routine (with even less generation of noise).

In particular, in the first operating state (and in the second operating state) the motor vehicle is driven by means of a torque of a drive unit of the motor vehicle. In the second operating state, situations in particular can be taken into account in which torque of the drive unit is not used to drive the motor vehicle. For example, in the second operating state the drive unit is then idling, i.e. a drive train of the motor vehicle is separated from the drive unit e.g. by means of a clutch, so that the drive unit and drive train are not connected to one another (and torque is not being transmitted between the drive train and the drive unit).

The motor vehicle is preferably in the second operating state.

An internal combustion engine which is provided as the drive unit of the motor vehicle can be switched off in the second operating state (e.g. as a result of an automatic start-stop system).

In particular, the second (or n+1th) control routine corresponds to the first (or nth) control routine which is acted on by a PT1 controller or a PT2 controller.

In particular, the control routines differ in respect of the controller which is used. In particular, a signal which is used to actuate the actuator or the drive motor (and which follows the desired activation of the actuator and is intended to implement the desired activation (setpoint activation)) is decelerated or braked to a greater or lesser extent in comparison with the setpoint activation by the control routine which is used. In this context, a PT1 controller can be used in a first (or nth) control routine, while in a second (or n+1th) control routine (with reduced dynamics) a PT2 controller is used.

In particular it is also possible for the control routine to be formed by a combination of a PT1 controller and a PT2 controller or for the control routine to be interpolated between the signal of a PT1 controller and that of a PT2 controller. Furthermore, it is also possible to interpolate between the measurement variable and the setpoint value specification, so that the actual system time constant can be approximated further.

According to one example, the component is a clutch. In particular, the actuator is therefore provided to activate a clutch, in particular a multi-disk clutch, preferably a clutch which is arranged on a side shaft of a motor vehicle, so that by closing the clutch the entire axle (the actuated clutch is referred to as a booster here) or else just one wheel (the actuated clutch is referred to as a twinster here) of the motor vehicle is connected to a drive unit of the motor vehicle in a torque-transmitting fashion. The actuator is, in particular, an electromechanical actuator.

The method can be deselected, in particular, in accordance with a setpoint position of the actuator which is requested with the desired activation. In particular it is possible to identify (e.g. by means of the manner in which the activation of the actuator is initiated) whether, under certain circumstances, a (nth) control routine which is to be selected on the basis of the present operating state is to be replaced by another (in particular an n−1th or the first) control routine.

If appropriate, it is possible to infer from the manner in which the activation is initiated (if the desired activation takes place very quickly or if high torques of the drive unit are to be transmitted as quickly as possible to a drive train of the motor vehicle) whether a higher level of generation of noise by the actuator unit owing to the high dynamics should be accepted in order to permit more rapid implementation of the desired activation.

The method can be deselected in accordance with an absolute value of a torque which is requested with the desired activation.

If the method is deselected, the drive motor of the actuator can be actuated or accelerated immediately in accordance with the control routine (thus with high/maximum dynamics).

Furthermore, a motor vehicle is proposed, at least having a drive unit for driving the motor vehicle and an actuator unit with an actuator for activating a component of the motor vehicle. The actuator unit has a drive motor for driving the actuator and a control device. The control device is suitably designed and configured to carry out the method already described and can execute the method described here, while the motor vehicle is operating.

In particular, the component is a clutch by means of which a torque of the drive unit for driving the motor vehicle can be coupled into a drive train of the motor vehicle and decoupled therefrom.

The statements about the method can be transferred, in particular, to the motor vehicle, and vice versa.

By way of precaution it is to be noted that the numerical expressions used here ("first", "second", . . . ) serve predominantly (only) to differentiate a plurality of identical subject matters, variables or processes, that is to say in particular do not necessarily specify any dependence and/or sequence of these subject matters, variables or processes with respect to one another. If dependence and/or sequence is necessary, this is indicated explicitly here or is apparent to a person skilled in the art in an obvious way on studying the specifically described configuration.

The method and motor vehicle and the technical field are explained in more detail below with reference to the figures. It is to be noted that the method and motor vehicle are not intended to be limited by the examples shown. In particular, unless explicitly stated otherwise, it is also possible to extract partial aspects of the contents explained in the figures and to combine them with other components and realizations from the present description and/or figures. Identical reference signs denote identical subject matters so that, if appropriate, explanations from other figures can be additionally used.

BRIEF DESCRIPTION OF THE DRAWINGS

FIG. 1 shows a motor vehicle 3 with an actuator unit 2 and part of a clutch as a component 4 in a side view and with a control device 9.

DETAILED DESCRIPTION

Figure 1:
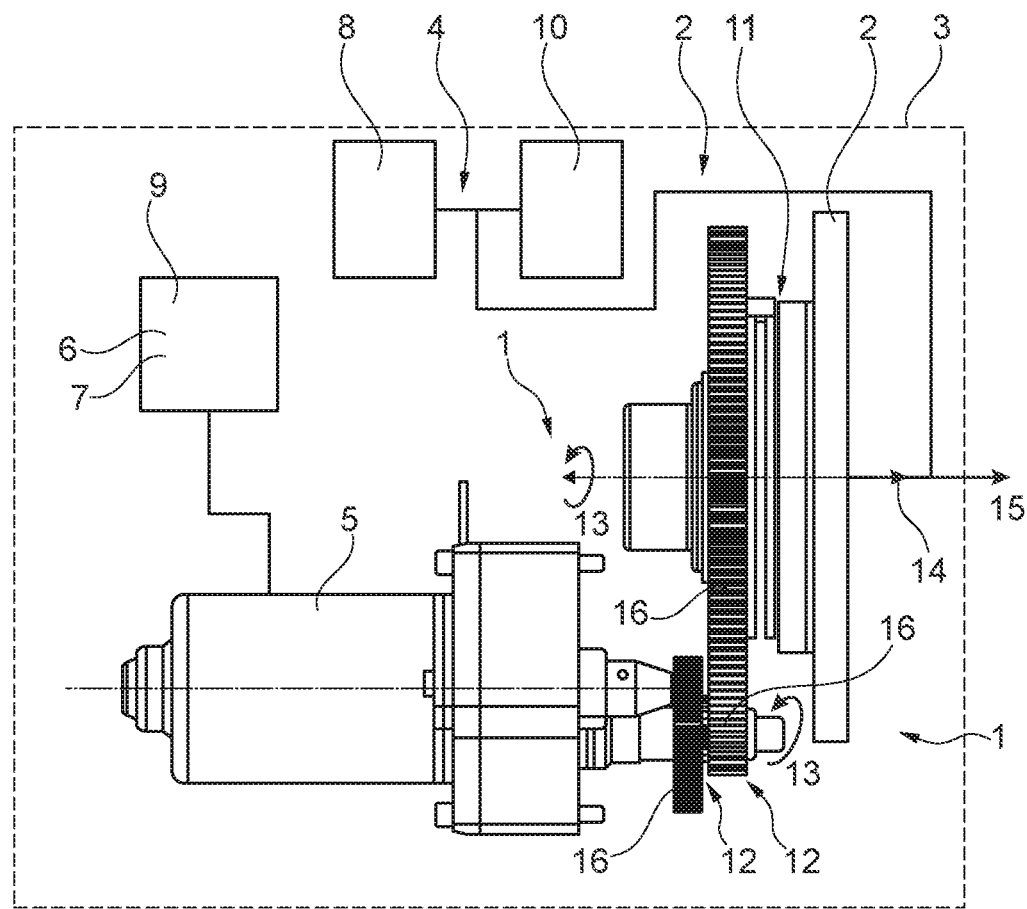
FIG. 1 shows a motor vehicle with an actuator and part of a clutch in a side view and with a control device.

The design of a clutch and of an actuator 1 illustrated here is known, e.g., from DE 100 65 355 C2.

The actuator 1 comprises an electric drive motor 5 and a control unit 9, a ramp mechanism 11 and a transmission means 12. A rotational movement 13 of the drive motor 5 is transmitted via a transmission means 12 (the gearwheel pairings) to the ramp mechanism 11. The rotational movement 13 of the drive motor 5 is converted into a movement 14 in an axial direction 15 by means of the ramp mechanism 11. The movement 14 is used to activate the component 4, here a clutch. The clutch serves to connect the drive unit 8 and drive train 10 (e.g. transmission, side shafts, longitudinal shafts) for driving the wheels of the motor vehicle 3.

The actuator 1 has the drive motor 5 and a plurality of gearwheel pairings (mechanical components 16 of the actuator unit 2 which are connected to one another, e.g., with play) as a transmission means 12 via which a torque of the drive motor 5 can be transmitted in order to activate the component 4.

Noise can be caused by the actuator unit 2, e.g. by the application of the tooth flanks of the gearwheels which are in engagement with one another (particularly when the (rotational) movement of the drive motor 5 is reversed). When the actuator 1 is activated with high dynamics (first control routine 6), the drive motor 5 is actuated at a high speed and with the lowest possible deceleration in comparison with the desired activation. In this context, e.g. the mechanical components 16 of the actuator unit 2 which are connected to one another with play are accelerated and moved as quickly as possible, so that once the play which is present between the components 16 is overcome, mechanical contact occurs between the components 16. This mechanical contact can be perceived acoustically (can be audible) by occupants of the motor vehicle 3, particularly in specific operating states of the motor vehicle 3.

It is now proposed here that in accordance with a currently present operating state of the motor vehicle 3, it will be detected, by means of the control device 9, which control routine 6, 7 is to be selected to actuate the drive motor 5.

The second control routine 7 comprises activation of the actuator 1 with adapted and/or lower dynamics (rotational speed, acceleration or braking) than by means of the first control routine 6. The actuator 1 or its drive motor 5 is actuated here taking into account the real system behavior. In this context, a sudden acceleration of the drive motor 5 and of the components 16 which are driven by means of the drive motor 5 is avoided by more gentle movement of the drive motor 5.

In particular, this makes it possible that play which is present between the mechanical components of the actuator unit 2 is overcome with adapted and/or reduced acceleration or speed. For example, this can make it possible that the tooth flanks of gearwheels which are in engagement with one another come to bear more slowly against one another than in the first control routine 6. In this way, the generation of noise can be reduced.

Figure 2:
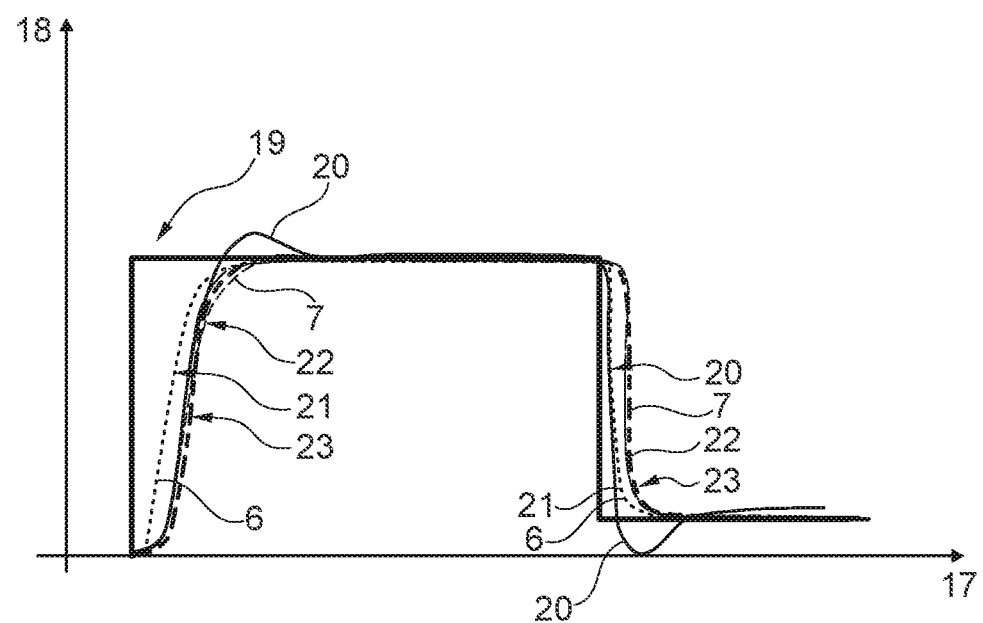
FIG. 2 shows a progression of actuation of the actuator according to a plurality of control routines in a diagram.

FIG. 2 shows the progression of the actuation of the actuator 1 according to a plurality of control routines 6, 7 in a diagram. In the diagram, the time 17 is plotted on the horizontal axis, and the position 18 of the drive motor 5 is plotted on the vertical axis.

The first progression 19 shows the desired activation of the actuator 1. The drive motor 5 is therefore to be moved to a specific position 18. A normal (known) control operation is illustrated by means of the second progression 20. The drive motor 5 is moved as quickly as possible by means of the control device 9, wherein overshooting and undershooting of the drive motor 5 to reach the desired position 18 can be detected.

The third progression 21 shows the measured progression of the position 18 of the drive motor 5 according to a first control routine 6, wherein the third progression 21 was generated with a PT1 controller on the basis of the second progression 20.

The fourth progression 22 shows the measured progression of the position 18 of the drive motor 5 according to a second control routine 7, wherein the fourth progression 22 was generated with a PT2 controller on the basis of the second progression 20.

The fifth progression 23 shows the measured progression of the position 18 of the drive motor 5 according to a further control routine, wherein the fifth progression 23 is formed during the rising of the position 18 (upward along the vertical axis) by interpolation of the third progression 21 and of the fourth progression 22 as well as by interpolation of the measurement variable and setpoint value variable in order to approximate the filter time constants to the system time constant. During the drop in the position 18 (downward along the vertical axis), the fifth progression 23 follows the fourth progression 22 (the signal of the PT2 controller).

LIST OF REFERENCE NUMBERS

1 Actuator
2 Actuator unit
3 Motor vehicle
4 Component
5 Drive motor
6 First control routine
7 Second control routine
8 Drive unit
9 Control device
10 Drive train
11 Ramp mechanism
12 Transmission means
13 Rotational movement
14 Movement
15 Axial direction
16 Component
17 Time
18 Position
19 First progression
20 Second progression
21 Third progression
22 Fourth progression
23 Fifth progression

The invention claimed is:

1. A method for controlling an actuator of an actuator unit of a motor vehicle, comprising:
   a) detecting a desired activation of the actuator, wherein the actuator unit includes the actuator, at least one component that is activated by the actuator, and a drive motor for driving the actuator;
   b) detecting whether a currently present operating state of the motor vehicle is a first operating state or a second operating state;
   c) selecting either a first control routine upon detecting the first operating state or a second control routine upon detecting the second operating state; and
   d) actuating the drive motor with the selected first control routine or second control routine, wherein in the first operating state the actuator is activated according to the first control routine with high dynamics of the drive motor, and in the second operating state the actuator is activated according to the second control routine with adapted dynamics of the drive motor; and
   wherein the first operating state and the second operating state relate at least to generation of noise by the motor vehicle.

2. The method of claim 1, wherein the motor vehicle has a first noise generation level in the first operating state and a second noise generation level in the second operating state, and the second noise generation level is lower than the first noise generation level.

3. The method of claim 1, wherein in the first operating state the motor vehicle is driven by means of a torque of a drive unit of the motor vehicle, and in the second operating state torque of the drive unit is not used to drive the motor vehicle in at least one situation.

4. The method of claim 1, wherein an internal combustion engine which is provided as a drive unit of the motor vehicle is switched off in the second operating state.

5. The method of claim 1, wherein the second control routine corresponds to the first control routine which is delayed with a PT1 controller or a PT2 controller.

6. The method of claim 1, wherein the at least one component is a clutch.

7. The method of claim 1, further comprising preventing steps (a) to (d) from performing in response to a setpoint position of the actuator which is requested with the desired activation.

8. A system for a motor vehicle, comprising:
   a drive unit for driving the motor vehicle; and
   an actuator unit including an actuator, a component, a drive motor for driving the actuator, and a control device, wherein the actuator is configured to activate the component;
   wherein the control device is programmed to:
   a) detect a desired activation of the actuator;
   b) detect whether a currently present operating state of the motor vehicle is a first operating state or a second operating state;
   c) select either a first control routine upon detecting the first operating state or a second control routine upon detecting the second operating state; and
   d) actuate the drive motor with the selected first control routine or second control routine;
   wherein in the first operating state the actuator is activated according to the first control routine with high dynamics of the drive motor, and in the second operating state the actuator is activated according to the second control routine with adapted dynamics of the drive motor; and
   wherein the first operating state and the second operating state relate at least to generation of noise by the motor vehicle.

9. The system of claim 8, wherein the component is a clutch by which a torque of the drive unit for driving the motor vehicle can be coupled into a drive train of the motor vehicle and decoupled therefrom.

10. The system of claim 8, wherein the motor vehicle has a first noise generation level in the first operating state and a second noise generation level in the second operating state, and the second noise generation level is lower than the first noise generation level.

11. The system of claim 8, wherein in the first operating state the motor vehicle is driven by means of a torque of the drive unit of the motor vehicle, and in the second operating state torque of the drive unit is not used to drive the motor vehicle in at least one situation.

12. The system of claim 8, wherein an internal combustion engine which is provided as the drive unit of the motor vehicle is switched off in the second operating state.

13. The system of claim 8, wherein the second control routine corresponds to the first control routine which is delayed with a PT1 controller or a PT2 controller.

14. The system of claim 8, wherein the control device is further programmed to prevent steps (a) to (d) from performing in response to a setpoint position of the actuator which is requested with the desired activation.

15. A control device comprising a processor and a memory storing instructions executable by the processor to:
   a) detect a desired activation of an actuator, wherein an actuator unit of a motor vehicle includes the actuator, at least one component that is activated by the actuator, and a drive motor for driving the actuator;
   b) detect whether a currently present operating state of the motor vehicle is a first operating state or a second operating state;
   c) select either a first control routine upon detecting the first operating state or a second control routine upon detecting the second operating state; and
   d) actuate the drive motor with the selected first control routine or second control routine, wherein in the first operating state the actuator is activated according to the first control routine with high dynamics of the drive motor, and in the second operating state the actuator is activated according to the second control routine with adapted dynamics of the drive motor; and
   wherein the first operating state and the second operating state relate at least to generation of noise by the motor vehicle.

16. The control device of claim 15, wherein the motor vehicle has a first noise generation level in the first operating state and a second noise generation level in the second operating state, and the second noise generation level is lower than the first noise generation level.

17. The control device of claim 15, wherein in the first operating state the motor vehicle is driven by means of a torque of a drive unit of the motor vehicle, and in the second operating state torque of the drive unit is not used to drive the motor vehicle in at least one situation.

18. The control device of claim 15, wherein an internal combustion engine which is provided as a drive unit of the motor vehicle is switched off in the second operating state.

19. The control device of claim 15, wherein the second control routine corresponds to the first control routine which is delayed with a PT1 controller or a PT2 controller.

20. The control device of claim 15, further comprising preventing steps (a) to (d) from performing in response to a setpoint position of the actuator which is requested with the desired activation.

* * * * *